(12) United States Patent
Iwaki

(10) Patent No.: US 6,507,559 B1
(45) Date of Patent: Jan. 14, 2003

(54) OPTICAL RECORDING MEDIUM HAVING LIGHT TRANSPARENT COVER LAYER SMALLER IN OUTER DIAMETER THAN SUBSTRATE

(75) Inventor: Tetsuo Iwaki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/568,672

(22) Filed: May 11, 2000

(30) Foreign Application Priority Data

May 12, 1999 (JP) .......................................... 11-130703

(51) Int. Cl.[7] ................................................ G11B 7/24
(52) U.S. Cl. ..................... 369/275.5; 428/64.4; 369/283
(58) Field of Search .............................. 369/275.5, 272, 369/273, 283, 281, 280, 286; 428/64.1, 64.4, 64.3

(56) References Cited

U.S. PATENT DOCUMENTS 5,714,222 A * 2/1998 Yokoyama 6,262,948 B1 * 7/2001 Watanabe et al. ............. 369/13
6,353,592 B1 * 3/2002 Kashiwagi et al. ......... 369/283

FOREIGN PATENT DOCUMENTS

JP          10-302310          11/1998

* cited by examiner

Primary Examiner—Tan Dinh
(74) Attorney, Agent, or Firm—Dick, Bronstein, Roberts & Cushman/Edwards&Angell LLP; David G. Conlin; John Joseph Penny, V

(57) ABSTRACT

An optical recording medium is an optical disk formed by bonding a substrate to a light transparent cover layer smaller in thickness than the substrate, and the optical disk includes one or more recording layer between the substrate and the light transparent cover layer. The light transparent cover layer is smaller in diameter than the substrate. Further, it is desirable that an outer edge of the substrate be higher than a between-edge part of the substrate. With this arrangement, a bonding surface of the substrate and the light transparent cover layer is not exposed out of an outer curved surface. Accordingly, it is possible to protect the bonding surface between the outer edge and the inner edge so as to increase strength against exfoliation of the light transparent cover layer.

17 Claims, 11 Drawing Sheets

OPTICAL RECORDING MEDIUM HAVING LIGHT TRANSPARENT COVER LAYER SMALLER IN OUTER DIAMETER THAN SUBSTRATE

FIELD OF THE INVENTION

The present invention relates to an optical recording medium, in which a substrate is bonded to a light transparent cover layer smaller in thickness than the substrate, one or more recording layer is provided between the substrate and the light transparent cover layer, and light is emitted from a light source by using an object lens from the side of the light transparent cover layer so as to record and reproduce information.

BACKGROUND OF THE INVENTION

An optical information recording method has a variety of advantages including (1) recording and reproducing without making contact, (2) a recording density higher than a magnetic recording method by more than one digit, and (3) applicability to all the memory types of a Read-only type, a Write Once Read Many type, and a Rewritable type. The method also realizes a large-capacity file at low cost. Thus, a wide range of uses has been considered from industrial use to commercial use.

An optical recording medium such as an optical disk is adopted for this optical information recording method. A compact disk (CD) used as a music disk for reproduction and a mini disk (MD) for recording and reproduction have widely prevailed in the market. Such CD and MD have a light transparent substrate with thickness of 1.2 mm. One of the surfaces of the light transparent substrate includes an information recording layer and a protecting layer for protecting the information recording layer. In such CD and MD, light with a wavelength of 780 nm is emitted from the opposite side of the information recording layer to the light transparent substrate via an object lens having an NA (numerical aperture)=0.45 so as to record or reproduce information.

Incidentally, there has been demand for storing a large amount of information (data) such as moving picture information in the optical disk. Thus, a higher recording density has been considered. In the case of the optical disk, the recording density generally depends upon a spot size of a light beam on the optical disk. The spot size increases proportionally to $\lambda/NA$ ($\lambda$ represents a wavelength of a light beam, and NA represents a numerical aperture of an optical system); thus, a shorter wavelength of a light beam and a larger numerical aperture considerably contribute to a higher recording density.

However, a coma caused by the tilted optical disk increases proportionally to the cube of the NA, so that a larger numerical aperture of the optical system results in an extremely small tilt margin (allowable tilt angle) of the optical disk. Therefore, a slight tilt of the optical disk causes a blurred spot of the light beam, so that a high recording density cannot be achieved.

When the optical disk has the light transparent substrate with a thickness of t, the coma increases proportionally to $t \cdot NA^3$. Regarding a digital versatile disk (DVD), an optical system is used with a large numerical aperture of NA=0.6, and a wavelength of a light beam is shortened from 780 nm to 650 nm so as to achieve a higher recording density. A thickness of the light transparent substrate is set at 0.6 (mm), which is smaller than those of the CD and the MD, so as to obtain a sufficient tilt margin even in the case of the optical system having a large numerical aperture of NA=0.6. Such a high recording density can achieve a recording capacity of 4.7 GB, which is equivalent to no less than 2 recording hours of moving picture signals.

However, the demand for a larger capacity and a longer recording time has been further increasing. In order to respond the aforementioned problem, an optical recording medium for storing data of 8 GB per one side is disclosed in Japanese Published Unexamined Patent Publication No. 302310/1998 (Tokukaihei 10-302310).

In the invention of the publication, a numerical aperture NA of an optical system is changed from 0.6 to 0.78 so as to achieve a high recording density. However, as described above, in the case of a larger numerical aperture of the optical system, a tilt margin (allowable tilt angle) enough for suppressing a coma becomes strict (smaller). The coma is caused by tilt of the optical disk. Therefore, in this invention, a thickness of the light transparent substrate is set smaller so as to minimize the likelihood of a coma caused by a tilt angle.

In this way, when the NA is increased to about 0.8, the thickness of the light transparent substrate needs to be reduced to about 0.1 mm. However, when the light transparent substrate is smaller in thickness, rigidity cannot be maintained by the light transparent substrate alone. It is therefore necessary to provide a reinforcing substrate on the back of the light transparent substrate with reference to a light source.

Hence, the optical disk used for the optical system with a large NA has a construction in which the thick substrate with high rigidity and a thin light transparent cover layer are bonded to each other, and the optical disk further includes a recording layer between the substrate and the light transparent cover layer. FIG. 11 shows a sectional drawing showing the construction of the optical disk. In this optical disk, a substrate 101 is used, which is made of a thermoplastic resin and includes guide concave 110 transferred upon molding. A recording layer 3 is formed on the substrate 101 by sputtering, and a light transparent cover layer 102 is bonded onto the recording layer 103 via an ultraviolet curing resin 104.

Further, in a pickup optical system having a large numerical aperture of about NA=0.8, a focal length of a lens is shorter, resulting in a short distance of approximately 0.3 mm between the lens and a surface of an optical disk (working distance). When the working distance is short, it is necessary to consider the likelihood of an accidental collision between the optical disk and the lens and to select a material with a certain degree of hardness for the light transparent cover layer.

However, when the hard light transparent cover layer is used, the two hard layers, that differ in rigidity, are bonded to each other via an adhesive; thus, when an impact is applied to a bonding part, the light transparent cover layer is likely to be severely deformed and peeled off.

Furthermore, the bonding part of the optical disk is exposed out of an outer curved surface of the optical disk, so that the outer curved surface is likely to receive an impact upon handling the optical disk; consequently, the light transparent cover layer tends to be peeled off at a bonding surface.

Moreover, the bonding part of the optical disk is exposed at a center hole of the disk as well, so that the bonding part is likely to receive an impact upon mounting the disk into a drive; thus, the light transparent cover layer tends to be peeled off at the bonding surface.

SUMMARY OF THE INVENTION

The present invention is devised to solve the aforementioned problem. The objective is to provide an optical recording medium, in which a substrate and a light transparent layer smaller in thickness than the substrate are bonded to each other, characterized in that an outer edge and an inner edge, on which exfoliation is likely to occur, are protected so as to secure reliability against exfoliation.

In order to achieve the above objective, an optical disk of the present invention, which includes a substrate, a light transparent cover layer bonded to the substrate with a smaller thickness than the substrate, and a first recording layer formed between the substrate and the light transparent cover layer, is characterized in that the light transparent cover layer is smaller in outer diameter than the substrate.

Further, it is desirable that the substrate and the light transparent cover layer be virtually formed into disks with center holes, the light transparent cover layer be smaller in outer diameter than the substrate, and the light transparent cover layer be larger in inner radius than the substrate.

According to the above arrangement, a bonding part of the light transparent cover layer and the substrate is not exposed out of outer and inner curved surfaces (circular cylinder surfaces), so that an impact is not directly applied to the bonding part; thus, the light transparent cover layer is less likely to be peeled off.

Moreover, the substrate is composed of an outer edge at a circumference, an inner edge around the center hole, and a between-edge part having a virtually flat surface. At least one of the outer edge and the inner edge is larger in thickness than the between-edge part. When the outer edge has an inner radius of $r0$ and the inner edge has an outer radius of $r1$, an outer radius of the light transparent cover layer is smaller than $r0$ and an inner radius of the light transparent cover layer is larger than $r1$.

According to the above arrangement, the bonding part of the light transparent cover layer and the substrate is protected by the outer edge and the inner edge that are provided at the outer and inner curved surfaces of the disk, so that an impact is not directly applied to the bonding part; thus, the light transparent cover layer is less likely to be peeled off.

Additionally, it is preferable to further provide a second recording layer between the first recording layer and the light transparent cover layer. Information is read out in the first recording layer by emitting light onto the first recording layer from the side of the substrate, and information is read out in the second recording layer by emitting light to the second recording layer from the side of the light transparent cover layer.

According to the above arrangement, regarding a bonded disk, in which the light transparent cover layer is less likely to be peeled off, compatibility between CD/DVD can be achieved with ease.

Furthermore, in order to achieve the aforementioned objective, the optical disk of the present invention, which includes a substrate, a light transparent cover layer bonded to the substrate with a smaller thickness than the substrate, and a first recording layer formed between the substrate and the light transparent cover layer, is characterized in that the substrate and the light transparent cover layer are formed into disks with center holes, and an outer curved surface (outer circular cylinder surface) of the light transparent cover layer is disposed inside an outer curved surface of the substrate.

According to the above arrangement, a bonding part of the light transparent cover layer and the substrate is not exposed out of the outer curved surface, so that an impact is not directly applied to the bonding part; thus, the light transparent cover layer is less likely to be peeled off.

Further, in order to achieve the aforementioned objective, the optical disk of the present invention, which includes a substrate, a light transparent cover layer bonded to the substrate with a smaller thickness than the substrate, and a first recording layer formed between the substrate and the light transparent cover layer, is characterized in that the substrate and the light transparent cover layer are formed into disks with center holes, and an inner curved surface of the light transparent cover layer is disposed outside an inner curved surface.

According to the above arrangement, a bonding part of the light transparent cover layer and the substrate is not exposed out of the inner curved surface, so that an impact is not directly applied to the bonding part; thus, the light transparent cover layer is less likely to be peeled off.

Moreover, in order to achieve the aforementioned objective, the optical disk of the present invention, which includes a substrate, a light transparent cover layer bonded to the substrate with a smaller thickness than the substrate, and a first recording layer formed between the substrate and the light transparent cover layer, is characterized in that the substrate and the light transparent cover layer are bonded via an adhesive and are welded (sealed) together.

According to the above arrangement, the substrate and the light transparent cover layer are bonded via the adhesive to each other and welded together at an outer edge and an inner edge, so as to increase strength against exfoliation caused by an impact.

Additionally, it is preferable to form projections on the welded part.

According to the above arrangement, the projections can increase the bonding strength (welding strength) between the substrate and the cover layer.

For a fuller understanding of the nature and advantages of the invention, reference should be made to the ensuing detailed description taken in conjunction with the accompanying drawings.

BRIEF DESCRIPTION OF THE DRAWINGS

FIG. 4(*b*) is a sectional drawing showing a manufacturing process of the optical disk shown in FIG. 4(*a*).

FIG. 5(*b*) is a sectional drawing showing a manufacturing process of the optical disk shown in FIG. 5(*a*).

DESCRIPTION OF THE EMBODIMENTS

The following explanation describes the detail of a concrete embodiment in accordance with the present invention. Here, a disk-type optical recording medium (hereinafter, referred to as an optical disk) will be discussed; however, other kinds of optical recording medium are also applicable to the present invention.

[EMBODIMENT 1]

Figure 1:
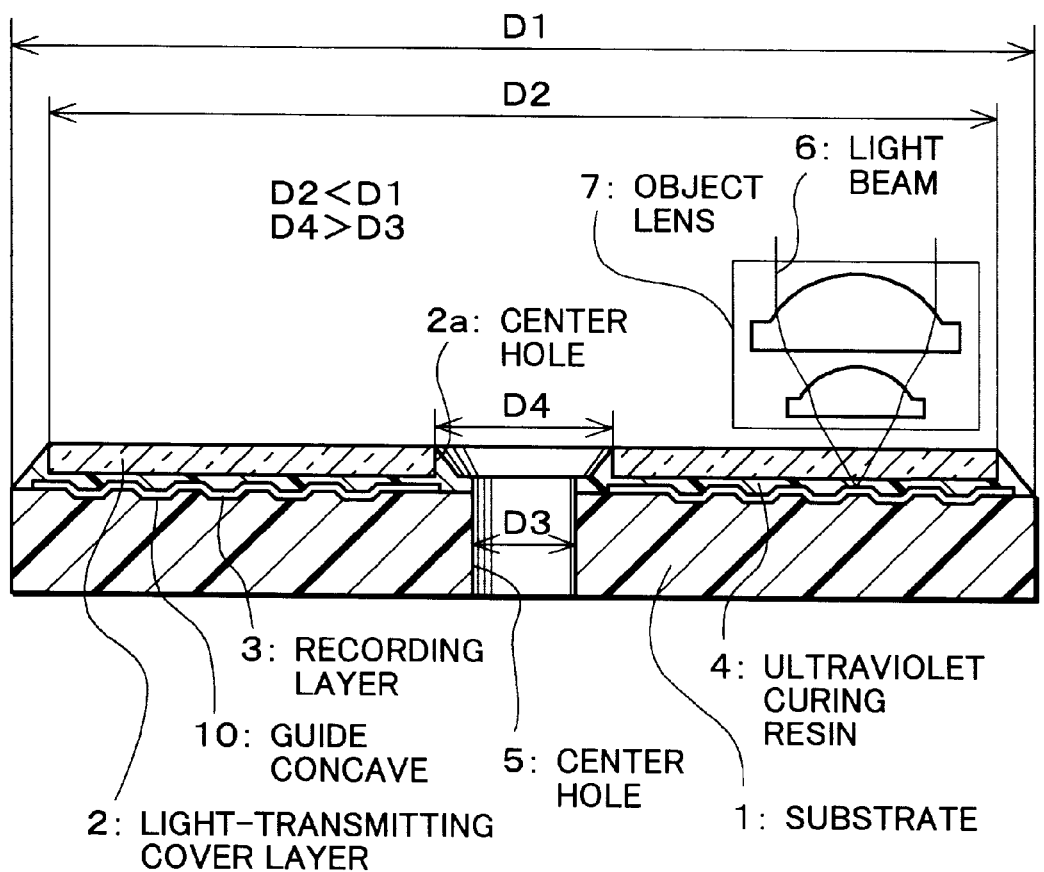
FIG. 1 is a sectional drawing showing the construction of a disk-type optical recording medium (optical disk) in accordance with one embodiment of the present invention.
Figure 2:
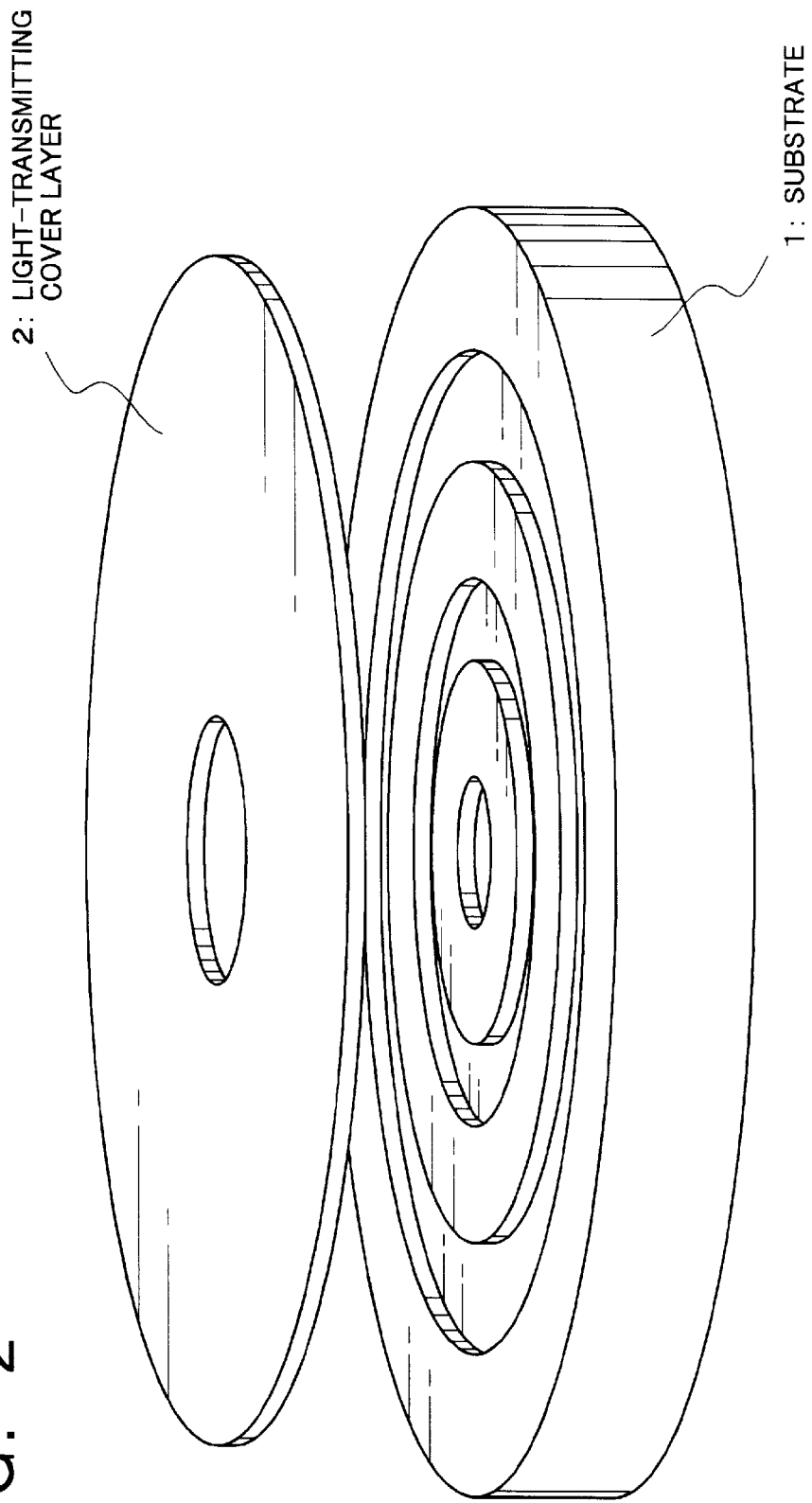
FIG. 2 is a perspective drawing showing a substrate and a light transparent cover layer that are included in the optical disk.

Referring to FIGS. 1 and 2, the following explanation describes an optical disk in accordance with one embodiment of the present invention. FIG. 1 is a sectional drawing showing the construction of the optical disk of the present embodiment. FIG. 2 is a perspective drawing showing a substrate (1) and a light transparent cover layer (2) that are included in the optical disk.

The substrate 1 is formed by providing a circular center hole 5 on a central part of a disk having an even thickness. A center axis of the disk and a center axis of the center hole 5 correspond to each other. The substrate 1 is formed by molding thermoplastic resin such as polycarbonate. On one of the surfaces of the substrate 1, a plurality of guide concave 10 are molded in a virtually concentric manner. Here, the other surface of the substrate 1 is smoothed out. A land/groove type and a pit type are both applicable as the guide concave 10. When a light beam 6 has a wavelength of $\lambda$, the depth of the concave or pit is set at $\lambda/8$ where cross talk is not likely to occur, or at $\lambda/4$ where a pit has the highest degree of modulation. In any case, the depth of the concave is set at a wavelength of the light beam 6 or less.

A recording layer 3 is formed on the guide concave 10 by using a method such as sputtering. As the recording layer 3, it is possible to adopt a) a recording film such as a phasechange recording film and a magneto-optic recording film, that is capable of recording for a plurality of times, b) a recording film made of a pigment material that is capable of recording for a single time, or c) a reflecting film made of a material such as Al for reproducing information from the pits.

Furthermore, the light transparent cover layer 2 is bonded onto the recording layer 3 via an ultraviolet curing resin 4 serving as an adhesive. The light transparent cover layer 2 is formed by providing a circular center hole 2a on a central part of a disk having an even thickness. A center axis of the disk and a center axis of the center hole 2a correspond to each other. Moreover, the center axis of the center hole 2a corresponds to that of the center hole 5. A thin plate composed of a glass or polycarbonate film and others is cut out in a concentric manner and is used as the light transparent cover layer 2.

When the substrate 1 and the light transparent cover layer 2 are bonded to each other, the ultraviolet curing resin 4, which is not cured, is sandwiched between the substrate 1 and the light transparent cover layer 2, an ultraviolet ray is emitted while a predetermined pressure is applied by using pressure plates (not shown). In this way, the substrate 1 and the light transparent cover layer 2 are bonded to each other.

Upon recording and reproducing information, the light beam 6 is emitted from the side of the light transparent cover layer 2 and is gathered via the object lens 7 on the recording layer 3. When achieving a surface recording density twice larger than a DVD with the same wavelength, the numerical aperture NA of the object lens 7 is set at 0.6×1.4, namely, approximately 0.84. When achieving an optical disk tilt margin equivalent to that of a CD with the same NA, a thickness of the light transparent cover layer 2 is set at $1.2 \times (0.45/0.84)^3$ or less, namely, approximately 0.18 mm or less.

Figure 3:
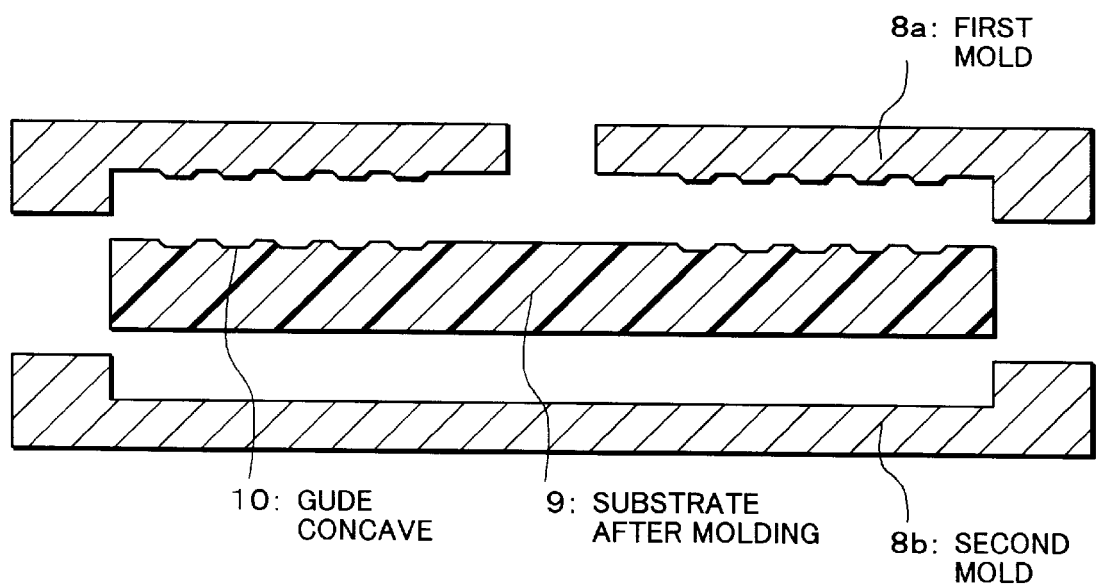
FIG. 3 is a sectional drawing schematically showing a method for molding the substrate.

FIG. 3 shows an example of the mold used for molding the substrate 1. On a mold 8a, ridges corresponding to the guide concave are previously formed in a virtually concentric manner. Meanwhile, a mold 8b has a smooth surface. When molding the substrate 1, a molding material for molding the substrate 1 is molded by the mold 8a and the mold 8b. Thus, the ridge shape on the mold 8a is transferred onto a substrate after molding 9 so as to form the guide concave in a virtually concentric manner. The center hole 5 has not been formed yet on the substrate after molding 9. After the molding operation, a hole is made at the center of the substrate by a cutter (not shown) so as to obtain the substrate 1 including the center hole 5.

As shown in FIG. 1, in the optical disk of the present embodiment, an outer diameter D2 of the light transparent cover layer 2 is smaller than an outer diameter D1 of the substrate 1. Thus, the bonding part of the substrate 1, on which the recording layer 3 is formed, and the light transparent cover layer 2 is not exposed out of the outer curved surface (outer circular cylinder surface) of the optical disk. Hence, an impact applied to the outer curved surface of the optical disk is not directly applied to the bonding part. Therefore, this arrangement makes it possible to increase strength against exfoliation of the light transparent cover layer regarding an impact applied to the outer curved surface of the optical disk.

Moreover, an inner diameter D4 (diameter of the center hole 2a) of the light transparent cover layer 2 is larger than an inner diameter D3 (diameter of the center hole 5) of the substrate 1. The bonding part of the substrate 1, on which the recording layer 3 is formed, and the light transparent cover layer 2 is not exposed out of an inner curved surface (inner circular cylinder surface) of the optical disk. Therefore, an impact applied to the inner curved surface of the optical disk is not directly applied to the bonding part. With this arrangement, the light transparent cover layer is less likely to be peeled off upon chucking the optical disk. Furthermore, in this case, the substrate 1 is exposed out of an inner edge of the optical disk, so that an accurate chucking is possible by chucking the optical disk at the exposed part.

Further, as described above, the optical disk of the present embodiment, which includes the substrate 1, a light transparent cover layer 2 bonded to the substrate 1 with a thickness smaller than the substrate 1, and the recording layer (first recording layer) 3 formed between the substrate 1 and the light transparent cover layer 2, has a construction in which each of the substrate 1 and the light transparent cover layer 2 is formed into a disk with the center hole 5, the outer curved surface of the light transparent cover layer 2 is disposed inside the outer curved surface of the substrate 1, and the inner curved surface of the light transparent cover layer is disposed outside (side farther from the center hole 5) the inner curved surface of the substrate 1.

According to the above arrangement, it is possible to prevent exfoliation of the light transparent cover layer 2 in the inner and outer curved surfaces of the optical disk and to performing a chucking operation with high accuracy at the inner curved surface of the optical disk.

[Embodiment 2A]

Figure 4:
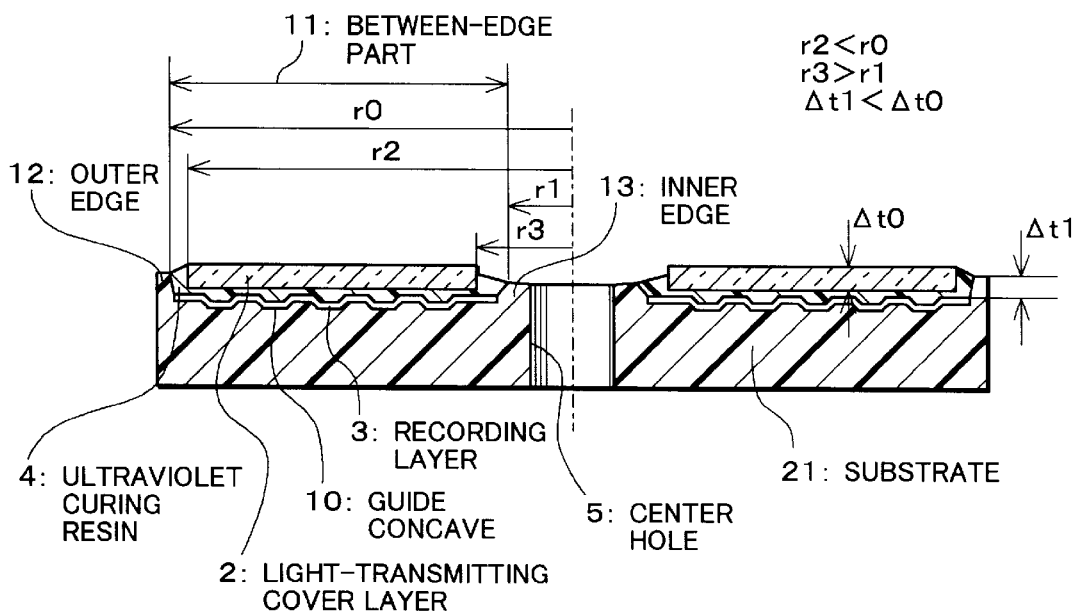
FIG. 4(*a*) is a sectional drawing showing the construction of an optical disk in accordance with another embodiment of the present invention.
Figure 4:
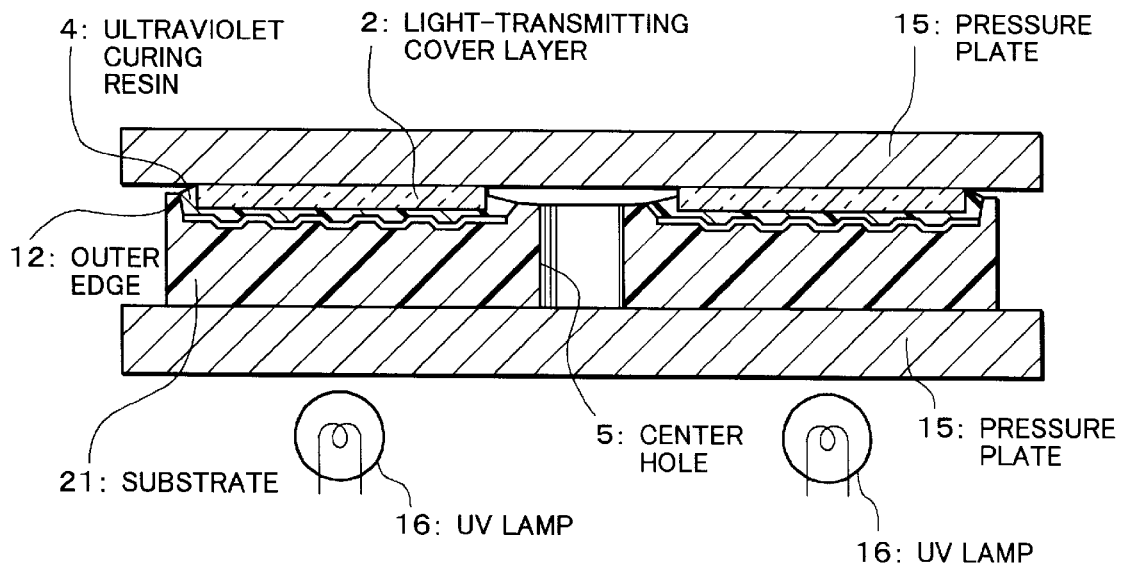

Referring to FIGS. 4(a) and 4(b), the following explanation describes an optical disk of another embodiment of the present invention. Here, for convenience of explanation, those members that have the same functions and that are described in Embodiment 1 are indicated by the same reference numerals.

As shown in FIG. 4(a), instead of a substrate 1, the optical disk of the present invention is provided with a substrate 21, in which an outer edge 12 is disposed around an outer diameter with a thickness larger than that of a between-edge part 11 (substrate thickness) having guide concave 10 formed thereon, and an inner edge 13 is disposed around a center hole 5 with a thickness larger than that of the between-edge part 11 having the guide concave 10 formed thereon. Here, the arrangement other than the above is the same as Embodiment 1 and the description thereof is omitted.

This arrangement makes it possible to protect a bonding surface of the substrate 21 and a light transparent cover layer 2 by the outer edge 12 and an inner edge 13, so that an impact applied to the curved surfaces (outer and inner curved (circular cylinder) surfaces) of the optical disk and stress caused by chucking are less likely to be applied directly to the bonding surface. Consequently, it is possible to increase the strength against exfoliation between the light transparent cover layer 2 and the substrate 21.

Moreover, as shown in FIG. 4(a), in the present embodiment, the light transparent cover layer 2 is arranged such that an outer radius r2 of the light transparent cover layer 2 is smaller than r0 and an inner radius r3 of the light transparent cover layer 2 is larger than r1, where r0 represents an inner radius of the outer edge 12 and r1 represents an outer radius of the inner edge 13.

Additionally, as shown in FIG. 4(a), the arrangement of the present embodiment satisfies $\Delta t1 < t0$, where $\Delta t1$ represents an increase in thickness between the between-edge part 11 and the outer edge 12 of the substrate 21 (namely, a difference in thickness between the between-edge part 11 and the outer edge 12), and t0 represents a thickness of the light transparent cover layer 2.

The substrate 21 and the light transparent cover layer 2 are bonded to each other as follows: after the substrate 21 and the light transparent cover layer 2 are bonded to each other via an ultraviolet curing resin 4, as shown in FIG. 4(b), a bonding pressure is applied onto the substrate 21 and the light transparent cover layer 2 by using pressure plates 15, and an ultraviolet ray is emitted onto the substrate 21 and the light transparent cover layer 2 by using an UV lamp 16 so as to cure the ultraviolet curing resin 4; thus, the bonding is completed between the substrate 21 and the light transparent cover layer 2.

When $\Delta t1 \geq t0$ is satisfied while a bonding pressure is applied to the substrate 21 and the light transparent cover layer 2, the outer edge 12 is projected, so that uneven pressure is likely to occur upon bonding the substrate 21 and the light transparent cover layer 2.

In order to apply an even pressure entirely on the light transparent cover layer 2, a thickness of $\Delta t1$ and the ultraviolet curing resin 4 upon bonding needs to be smaller than t0, and $\Delta t1$ needs to be smaller than at least t0.

Further, as mentioned above, in the optical disk of the present embodiment, a surface (upper surface) of the substrate 21, that faces the light transparent cover layer 2, is provided with a) an inner edge projecting part (inner edge 13), which is disposed inside the inner curved surface of the light transparent cover layer 2 and projects to the light transparent cover layer 2 so as to be higher than a surface of the light transparent cover layer 2, the surface facing the substrate 21, and b) an outer edge projecting part (outer edge 12), which is disposed outside the outer curved surface of the light transparent cover layer 2 and projects to the light transparent cover layer 2 (upward) so as to be higher than a surface (lower surface) of the light transparent cover layer 2, the surface facing the substrate 21.

According to the above arrangement, the bonding surface of the substrate 21 and the light transparent cover layer 2 is protected by the outer edge 12 and the inner edge 13, so that it is possible to more effectively prevent exfoliation of the light transparent cover layer 2.

Furthermore, as described above, in the optical disk of the present invention, the height $\Delta t1$ of the inner edge projecting part (inner edge 13) and the outer edge projecting part (outer edge 12) is set lower than the thickness t0 of the light transparent cover layer 2 (including a thickness of the ultraviolet curing resin 4). With this arrangement, upon bonding the substrate 21 and the light transparent cover layer 2, it is possible to apply pressure entirely on the bonding surface of the substrate 21 and the light transparent cover layer 2 by using the single smoothed pressure plate 15. Hence, the substrate 21 and the light transparent cover layer 2 are positively bonded to each other.

[Embodiment 2B]

Figure 5:
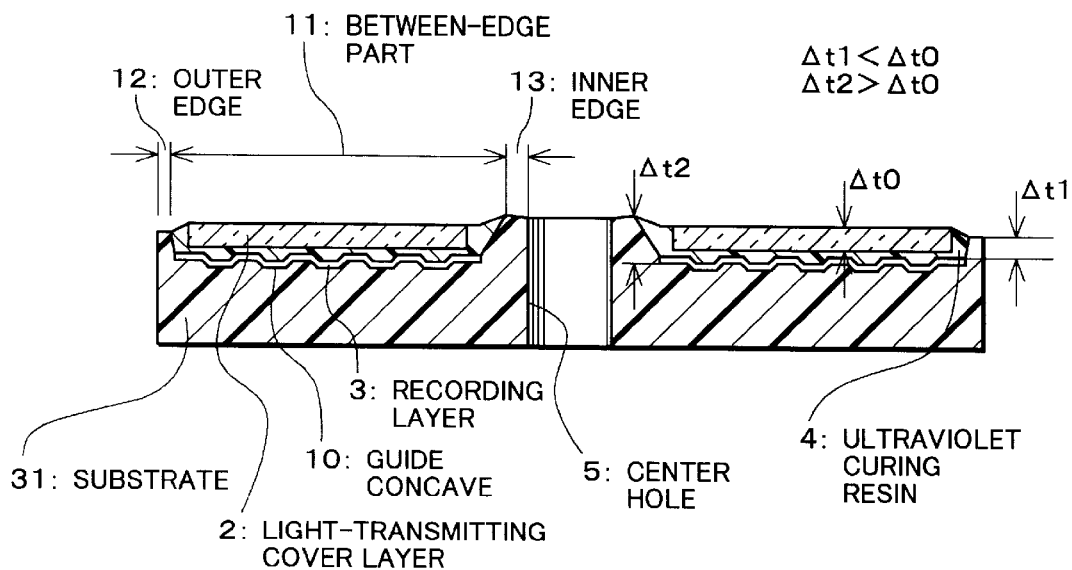
FIG. 5(*a*) is a sectional drawing showing the construction of an optical disk in accordance with still another embodiment of the present invention.
Figure 5:
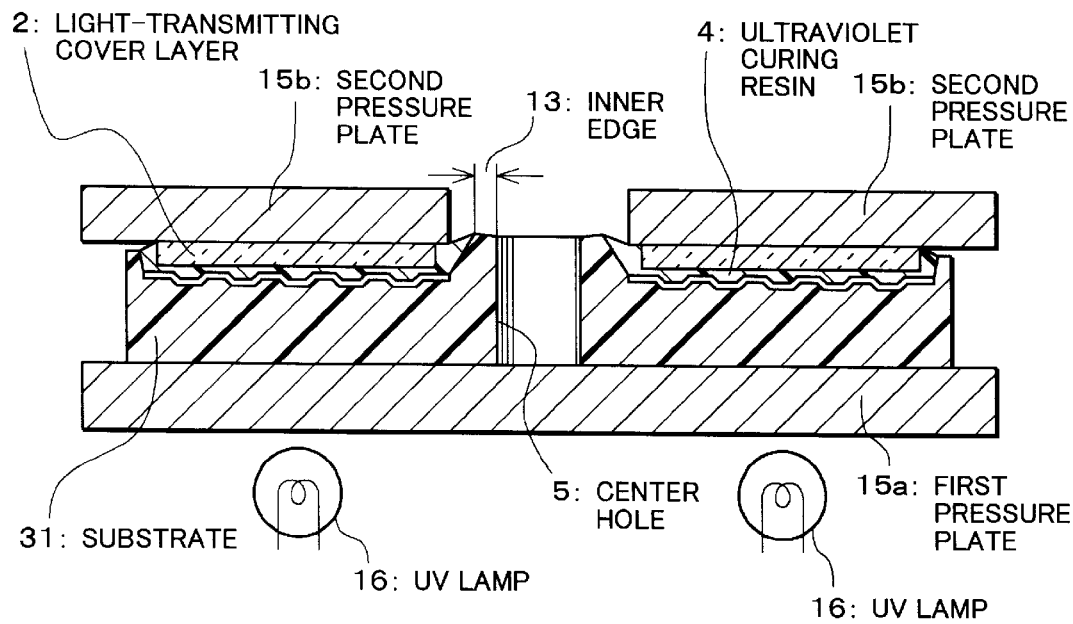
Figure 6:
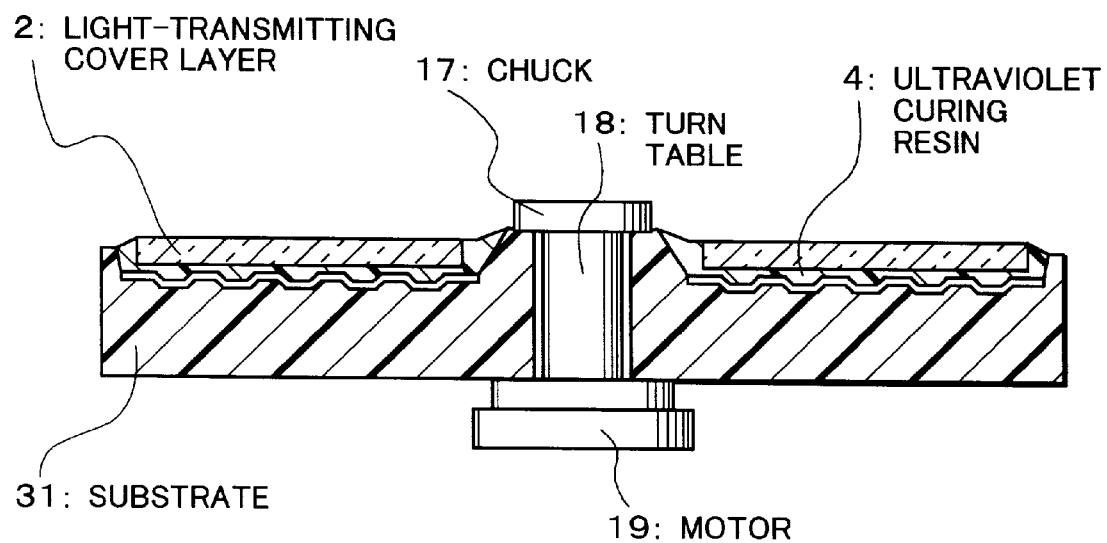
FIG. 6 is a diagram showing a medium holding section of an optical recording and reproducing device, in which the optical disk of FIG. 5(*a*) is mounted.

Referring to FIGS. 5(a), 5(b), and 6, the following explanation describes an optical disk in accordance with still another embodiment of the present invention. Here, for convenience of explanation, those members that have the same functions and that are described in Embodiment 2A are indicated by the same reference numerals and the description thereof is omitted.

When manufacturing the optical disk of the present embodiment, as shown in FIG. 5(b), pressure plates 15a and 15b, which are not disposed above an inner edge 13 of a substrate 31, are used as pressure plates for applying pressure upon bonding instead of a pressure plate of Embodiment 2A.

As shown in FIG. 5(a), in the optical disk of the present embodiment, this arrangement allows an inner edge 13 to project higher than a light transparent cover layer 2. Namely, as shown in FIG. 5(a), the optical disk of the present embodiment satisfies $\Delta t2 > t0$, where $\Delta t2$ represents an increase in thickness between a between-edge part 11 and the inner edge 13 of the substrate 31, and t0 represents a thickness of the light transparent cover layer 2. Therefore, a height $\Delta t1$ of an inner edge projecting part (inner edge 13) is larger than the thickness t0 of the light transparent cover layer 2 (including a thickness of the ultraviolet curing resin 4); meanwhile, a height $\Delta t1$ of an inner edge projecting part (inner edge 13) is larger than the thickness t0 of the light transparent cover layer 2 (including a thickness of the ultraviolet curing resin 4).

Here, the optical disk of the present embodiment has the same construction as the optical disk of Embodiment 2B, except that a substrate 31 includes a between-edge part 11 larger in thickness than a substrate 21.

According to the above arrangement, a bonding surface of the substrate 1 and the light transparent cover layer 2 is not exposed in a center hole 5, so that the light transparent cover layer 2 is less likely to be peeled off at the inner edge 13. Further, in the above arrangement, an inner curved surface (inner circular cylinder surface) of the light transparent cover layer 2 is not exposed in the center hole 5, so that the likelihood of the exfoliation of the light transparent cover layer 2 at the inner edge 13 is further reduced as compared with the construction of Embodiment 2A.

Moreover, referring to FIG. 6, another advantage of this arrangement is discussed. As shown in FIG. 6, the optical disk is mounted onto a turn table 18 disposed on a motor 19, by using a chuck 17. The accuracy of mounting the optical disk depends upon the accuracy of mounting the turn table 18 and a lower surface of the optical disk, and the accuracy of mounting the chuck 17 and an upper surface of the optical disk. As shown in FIG. 6, the optical disk of the present embodiment makes it possible to perform a chucking operation on a surface of the substrate 31, not on a bonded surface of the light transparent cover layer 2. With a method for holding the optical disk in FIG. 6, when the optical disk is mounted onto a drive, a surface of the substrate 31, that serves as a molding surface with high accuracy, can be held as a reference surface, instead of the bonded surface of the light transparent cover layer 2. For this reason, tilt (uneven surface) caused by mounting the inclined optical disk upon chucking is less likely to appear on the disk surface.

[Embodiment 3]

Figure 7:
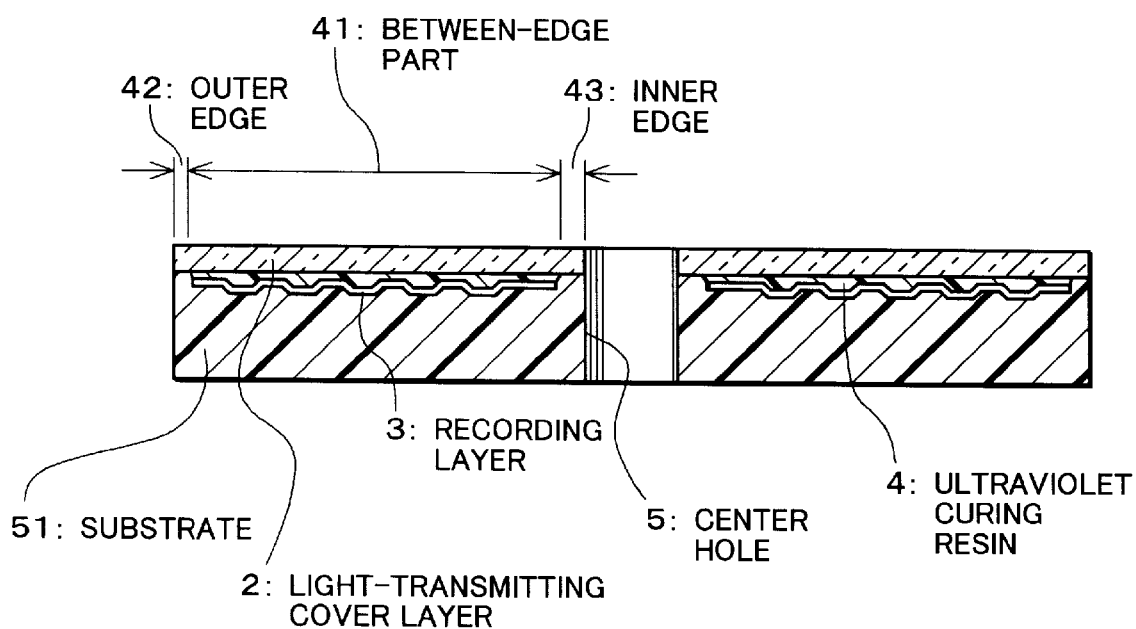
FIG. 7 is a sectional drawing showing the construction of an optical disk in accordance with still another embodiment of the present invention.
Figure 8:
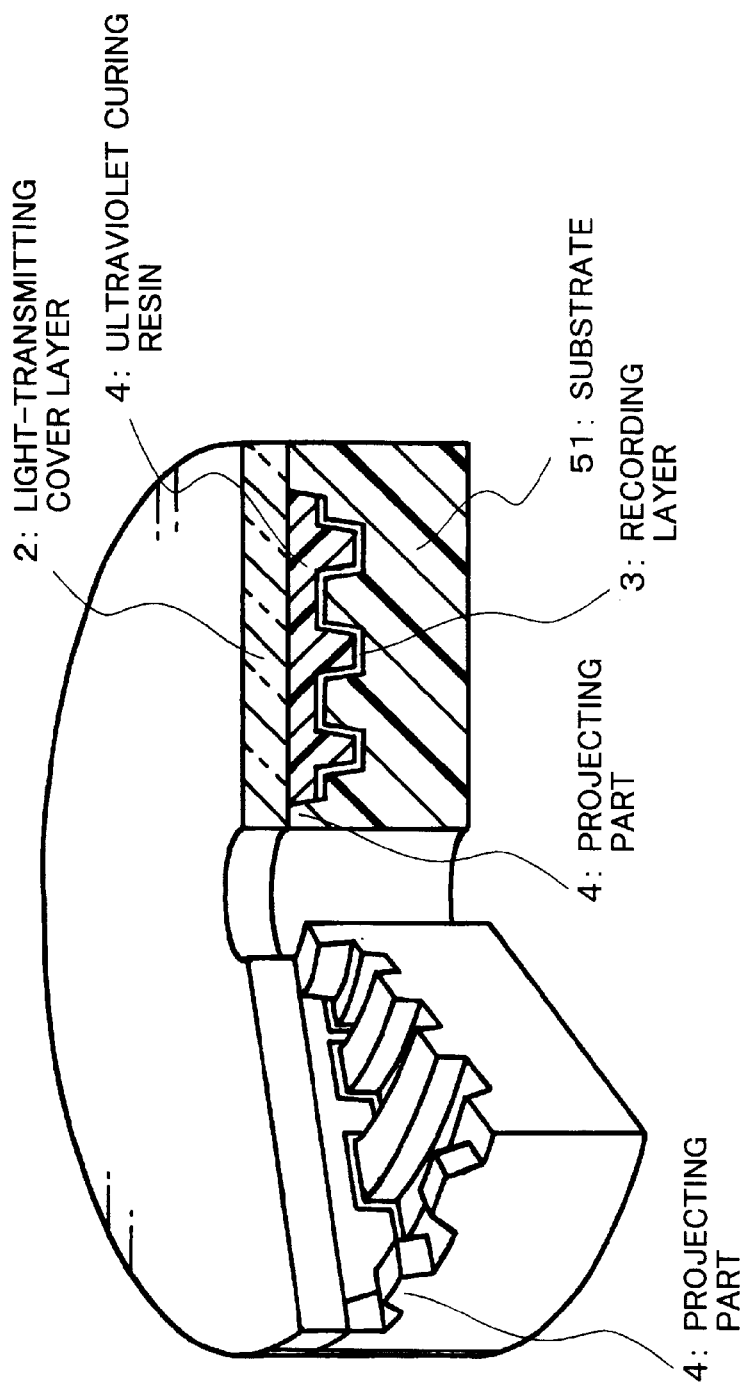
FIG. 8 is a sectional and perspective drawing partially showing the construction of the optical disk shown in FIG. 7.

Referring to FIGS. 7 and 8, the following explanation describes an optical disk in accordance with still another embodiment of the present invention. FIG. 7 is a sectional drawing showing the construction of the optical disk in accordance with the present embodiment. FIG. 8 is a perspective drawing partially showing a sectional view of the optical disk in accordance with the present embodiment.

Here, the optical disk of the present embodiment has the same fundamental construction as Embodiment 2A; hence, those members that have the same functions and that are described in Embodiment 2A are indicated by the same reference numerals and the description thereof is omitted.

The optical disk of the present embodiment is provided with a light transparent cover layer 2, a recording layer 3, and a substrate 51, which has the same construction as a substrate 1 except for the same inner diameter and outer diameter as the light transparent cover layer 2.

Moreover, the substrate 51 is constituted by an outer edge 42 at a circumference, an inner edge 43 around a center hole 5, and a between-edge part 41 having a virtually flat surface. At least one of the outer edge 42 and the inner edge 43 is larger in thickness than the between-edge part 41. The outer edge 42 and the inner edge 43 are welded (sealed) to the light transparent cover layer 2; meanwhile, the between-edge part 41 is bonded to the light transparent cover layer 2 via an ultraviolet curing resin (adhesive) 4. Here, the recording layer 3 is not provided on an outer edge 42 and an inner edge 43.

The present embodiment is characterized in that a thermoplastic resin such as polycarbonate is used for the substrate 51 and the light transparent cover layer 2, and the outer edge 42 and the inner edge 43 of the substrate 51 are welded to the light transparent cover layer 2.

The present embodiment is further characterized in that an outer edge 12 and an inner edge 13 of the substrate 1 are respectively provided with projecting parts 14. The projecting parts 14 are formed on parts where the substrate 1 is brought into contact with the light transparent cover layer 2 upon applying a pressure for bonding, namely, on the outer edge 42 and the inner edge 43 of the substrate 51.

Upon manufacturing the optical disk of the present embodiment, the between-edge part 41 of the substrate 51 is bonded to the light transparent cover layer 2, and the parts on which the substrate 51 is brought into contact with the light transparent cover layer 2 are welded together by heating or ultrasound. When the between-edge part 41 of the substrate 51 is bonded to the light transparent cover layer 2, the substrate 51 and the light transparent cover layer 2 are bonded to each other while disposing the ultraviolet curing resin 4 between the between-edge 41 of the substrate 51 and the light transparent cover layer 2, and then, the ultraviolet curing resin 4 is cured by using an UV lamp. This arrangement makes it possible to strengthen the bonding between the substrate 51 and the light transparent cover layer 2 at the inner edge and the outer edge of the optical disk so as to increase strength against exfoliation.

[Embodiment 4]

Figure 9:
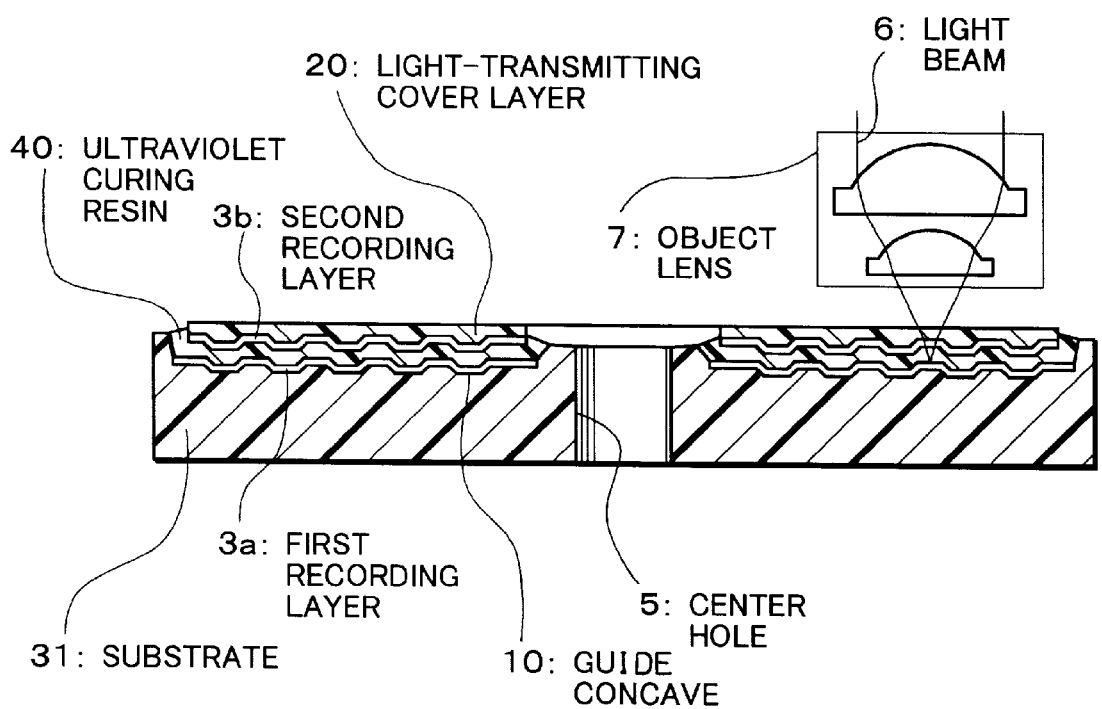
FIG. 9 is a sectional drawing showing the construction of an optical disk in accordance with still another embodiment of the present invention.
Figure 10:
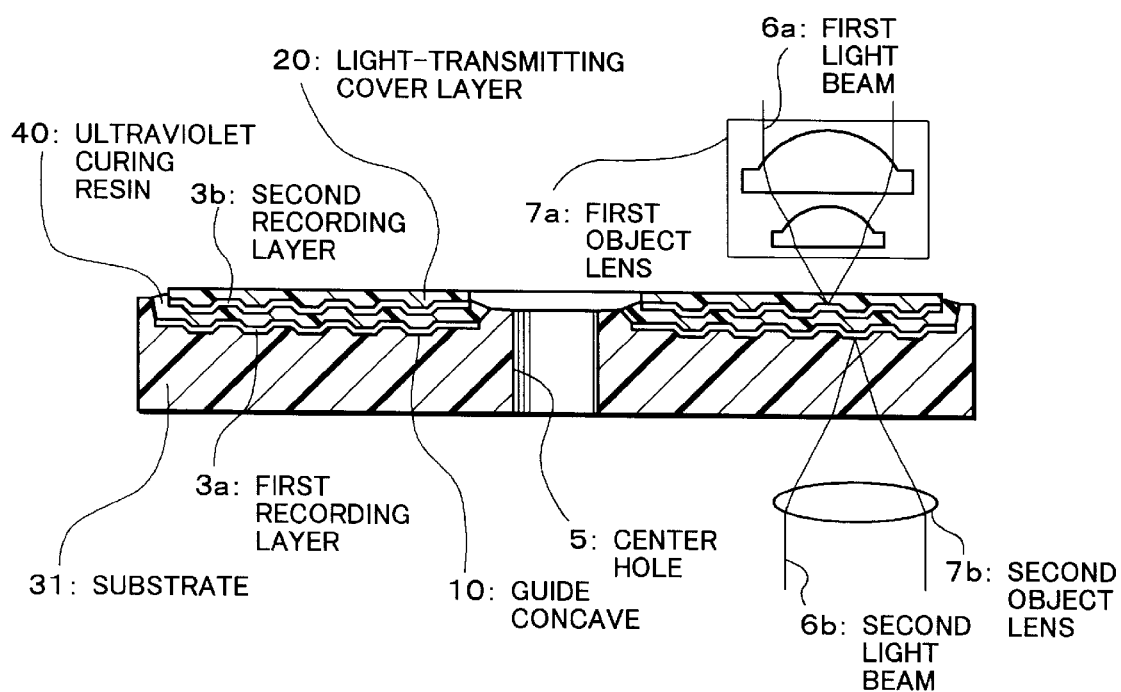
FIG. 10 is a sectional drawing showing the construction of an optical disk in accordance with still another embodiment of the present invention.
Figure 11:
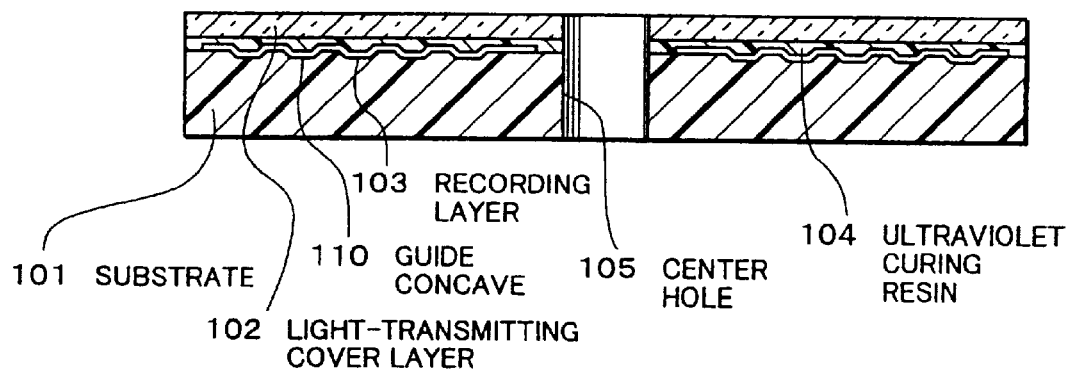
FIG. 11 is a sectional drawing showing the construction of a conventional optical disk.

Referring to FIGS. 9 and 10, the following explanation describes still another embodiment of the present invention. Here, those members that have the same functions and that are described in the aforementioned embodiments are indicated by the same reference numerals and the description thereof is omitted.

An optical disk of the present embodiment is provided with a bonded disk including two recording layers for protecting a bonding part. The optical disk of the present embodiment has the same construction as the optical disk of Embodiment 2A except that a light transparent cover layer with guide concave 20 is provided instead of a light transparent cover layer 2, and a second recording layer 3b is provided as a recording layer, the second recording layer 3b being formed on a substrate 31 in addition to a first recording layer 3a having the same construction as a recording layer 3.

In Embodiments 1 to 3, a thin film made of a material such as polycarbonate and glass is mainly used as a light transparent cover layer 2. In the case of a thermoplastic resin such as polycarbonate, as shown in FIG. 9, it is possible to form the light transparent cover layer with guide concave 20, which is a light transparent cover layer including guide concave on the side of the substrate 31, by molding. In this case, as shown in FIG. 9, the first recording layer 3a and the second recording layer 3b are respectively formed on guide concave 10 of the substrate 31 and guide concave of the light transparent cover layer with guide concave 20, an ultraviolet curing resin 4 is filled between the first recording layer 3a and the second recording layer 3b, and then, pressure is applied and an UV-curing is carried out so as to complete a disk with two recording layers.

The first recording layer 3a and the second recording layer 3b have suitable transmittance; thus, as shown in FIG. 9, the first recording layer 3a and the second recording layer 3b are capable of recording or reproducing information by a light beam 6 emitted via an object lens 7 from the side of the light transparent cover layer with guide concave 20. Here, FIG. 9 shows the same construction as Embodiment 2A (construction including the substrate 31); however, any one of constructions shown in Embodiments 1 to 3 can be adopted. In any case, it is possible to achieve a construction in which a bonding part between the substrate and the light transparent cover layer 2 is not exposed out of a curved surface of the optical disk, thereby protecting exfoliation between the substrate and the light transparent cover layer 2.

Further, in the same construction, it is also possible to set a recording density of the second recording layer 3b, which is formed on the guide concave of the light transparent cover layer with guide concave 20, so as to correspond to a first object lens 7a with a large NA, and it is also possible to set a recording density of the first recording layer 3a, which is formed on the guide concave of the substrate 1, so as to correspond to a second object lens 7b with a small NA. This arrangement makes it possible to read out the second recording layer 3b with a high recording density from the side of the cover layer and to reproduce the first recording layer 3a with a low recording density from the side of the substrate. In this case, when a substrate with a thickness of 1.2 mm, a single optical disk can achieve a CD compatible recording layer and a high-density recording layer. Moreover, when a substrate with a thickness of 0.6 mm is used as the substrate 1, a single optical disk can achieve a DVD compatible recording layer and the high-density recording layer. This arrangement makes it possible to provide a compatible disk which can perform recording and reproducing on drives such as a CD and a DVD with different specifications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium comprising:
   a substrate,
   a light transparent cover layer bonded to said substrate with a smaller thickness than said substrate, and
   a first recording layer formed between said substrate and said light transparent cover layer,
   wherein said light transparent cover layer is smaller in outer diameter than said substrate.

2. The optical recording medium as defined in claim 1, wherein said substrate and said light transparent cover layer are virtually formed into disks with center holes,
   said light transparent cover layer is smaller in outer diameter than said substrate, and
   said light transparent cover layer is larger in inner diameter than said substrate.

3. The optical recording medium as defined in claim 2, wherein said substrate is composed of an outer edge at a circumference, an inner edge around the center hole, and a between-edge part having a virtually flat surface,
   at least one of said outer edge and said inner edge is larger in thickness than said between-edge part, and
   when said outer edge has an inner radius of r0 and said inner edge has an outer radius of r1, said light transparent cover layer has an outer radius smaller than r0 and an inner radius larger than r1.

4. The optical recording medium as defined in claim 3, wherein $\Delta t1 < t0$ is satisfied, where t0 represents a thickness of said light transparent cover layer, and $\Delta t1$ represents a difference in thickness between said outer edge and said between-edge part.

5. The optical recording medium as defined in claim 3, wherein $\Delta t2 > t0$ is satisfied, where t0 represents a thickness of said light transparent cover layer, and $\Delta t2$ represents a difference in thickness between said inner edge and said between-edge part.

6. The optical recording medium as defined in claim 3, wherein $\Delta t1 < t0 < \Delta t2$ is satisfied, where t0 represents a thickness of said light transparent cover layer, $\Delta t1$ represents a difference in thickness between said outer edge and said between-edge part, and $\Delta t2$ represents a difference in thickness between said inner edge and said between-edge part.

7. The optical recording medium as defined in claim 1, further comprising a second recording layer between said first recording layer and said light transparent cover layer,
   wherein information is read out in said first recording layer by emitting light onto said first recording layer from a side of said substrate, and
   information is read out in said second recording layer by emitting light to said second recording layer from a side of said light transparent cover layer.

8. An optical recording medium comprising:
   a substrate,
   a light transparent cover layer bonded to said substrate with a smaller thickness than said substrate, and
   a first recording layer formed between said substrate and said light transparent cover layer,
   wherein said substrate and said light transparent cover layer are formed into disks with center holes, and
   an outer curved surface of said light transparent cover layer is disposed inside an outer curved surface of said substrate.

9. The optical recording medium as defined in claim 8, wherein a surface of said substrate that faces said light transparent cover layer includes an outer edge projecting part, which is disposed outside the outer curved surface of said light transparent cover layer and projects to said light transparent cover layer so as to be higher than a surface of said light transparent cover layer that faces said substrate.

10. The optical recording medium as defined in claim 9, wherein said outer edge projecting part has a height smaller than a thickness of said light transparent cover layer.

11. The optical recording medium as defined in claim 8, wherein an inner curved surface of said light transparent cover layer is disposed outside an inner curved surface of said substrate.

12. The optical recording medium as defined in claim 11, wherein a surface of said substrate that faces said light transparent substrate includes an inner edge projecting part, which is disposed inside the inner curved surface of said light transparent cover layer and projects to said light transparent cover layer so as to be higher than a surface of said light transparent cover layer that faces said substrate.

13. The optical recording medium as defined in claim 12, wherein said inner edge projecting part has a height larger than a thickness of said light transparent cover layer.

14. The optical recording medium as defined in claim 9, wherein an inner curved surface of said light transparent cover layer is disposed outside an inner curved surface of said substrate.

15. The optical recording medium as defined in claim 14, wherein a surface of said substrate that faces said light transparent substrate includes an inner edge projecting part, which is disposed inside the inner curved surface of said light transparent cover layer and projects to said light transparent cover layer so as to be higher than a surface of said light transparent cover layer that faces said substrate.

16. The optical recording medium as defined in claim 15, wherein said inner edge projecting part has a height larger than a thickness of said light transparent cover layer.

17. The optical recording medium as defined in claim 16, wherein said inner edge projecting part has a height smaller than a thickness of said light transparent cover layer.

* * * * *